(12) United States Patent
Kovacs

(10) Patent No.: US 6,650,500 B2
(45) Date of Patent: Nov. 18, 2003

(54) RECORDING AND/OR REPRODUCING APPARATUS HAVING A STATION TRANSMISSION COIL FOR CONTACTLESS COMMUNICATION WITH A CASSETTE TRANSPONDER

(75) Inventor: Ernst Kovacs, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 255 days.

(21) Appl. No.: 09/793,033

(22) Filed: Feb. 26, 2001

(65) Prior Publication Data

US 2001/0026412 A1 Oct. 4, 2001

(30) Foreign Application Priority Data

Feb. 29, 2000 (EP) .............................. 00890060

(51) Int. Cl.[7] .............................. G11B 5/008
(52) U.S. Cl. ....................................... 360/93
(58) Field of Search .................. 360/93–96.6

(56) References Cited

U.S. PATENT DOCUMENTS 5,345,231 A    9/1994  Koo et al. ................... 340/870

FOREIGN PATENT DOCUMENTS

| EP | 0373718 B1 | 11/1994 | ........... G11B/15/17 |
| EP | 0841663 A1 | 5/1998 | ........... G11B/23/40 |
| JP | 10-199216 | * 7/1998 | ................... 360/92 |
| WO | WO9844499 | 10/1998 | ........... G11B/15/67 |

OTHER PUBLICATIONS

Patent Abstracts of Japan, 10199216, Aug. 31, 1998 "Video Cassette Tape Processing Apparatus".

Patent Abstracts of Japan, 11203847, Aug. 30, 1999, "Information Transmission Device".

* cited by examiner

Primary Examiner—A. J. Heinz

(57) ABSTRACT

A recording and/or reproducing apparatus (1) adapted to receive a record carrier (4) advantageously includes a transponder communication device (35) having a planiform station transmission coil (37) for the contactless communication with a record record-carrier transmission coil (50) combined with the record carrier (4), and includes holding means (51) for holding the station transmission coil (37) which extend away from the station transmission coil (37) into the space which is remote from the record-carrier transmission coil (50).

3 Claims, 4 Drawing Sheets

RECORDING AND/OR REPRODUCING APPARATUS HAVING A STATION TRANSMISSION COIL FOR CONTACTLESS COMMUNICATION WITH A CASSETTE TRANSPONDER

FIELD OF THE INVENTION

The invention relates to a recording and/or reproducing apparatus adapted to receive a record carrier and to hold the record carrier in an operating position, the recording and/or reproducing apparatus including a transponder communication station having a station transmission coil for the contactless communication with a record-carrier transmission coil combined with the record carrier. The station transmission coil is planiform and has a first side facing the record-carrier transmission coil and a second side remote from the record-carrier transmission coil. A holding mechanism holds the station transmission coil and extends mainly away from the second side of the station transmission coil.

BACKGROUND OF THE INVENTION

Such a recording and/or reproducing apparatus is known from the patent document WO 98/44499 A1. The known recording and/or reproducing apparatus is adapted to receive a record carrier tape accommodated in a cassette, the record carrier tape being a magnetic tape provided with a plurality of parallel juxtaposed tracks which extend in the longitudinal direction on-screen display the tape and in which data can be stored with the aid of a multi-track magnetic head.

In such magnetic-tape cassettes it is common practice to accommodate a solid-state memory, preferably a semiconductor memory, for example in order to enable additional data specific to the magnetic-tape cassette as well as additional data specific to the magnetic tape to be stored in a simple manner. In this connection reference is made to, for example, the patent document EP 0 373 718 B1. From said patent document a construction is known in which the only contact-bound communication with the solid-state memory is possible via cassette-mounted terminal contacts.

However, in the meantime so-called transponder systems have become customary on a large scale in the field of storage technology. For such transponder systems reference is made, for example, to the patent document U.S. Pat. No. 5,345,231 A.

In the course of further developments, carried out by the applicant, on the known recording and/or reproducing apparatus as disclosed in the patent document WO 98/44499 A1, the demand has arisen to equip such a recording and/or reproducing apparatus with a transponder communication station designed for contactless communication with a transponder combined with a cassette. In the course of these developments a constructional concept and design were pursued by means of which always a proper and faultless contactless communication is guaranteed.

BRIEF SUMMARY OF THE INVENTION

It is an object of the invention to guarantee, in a recording and/or reproducing apparatus as defined herein, a reliable communication between a transponder communication station provided in the recording and/or reproducing apparatus and a transponder combined with a record carrier which is in its operating position in the recording and/or reproducing apparatus by constructionally simple means.

Owing to the provision of the characteristic features in accordance with the invention it is achieved in a constructionally simple manner that the station transmission coil of the transponder communication station is held at an optimally small distance from a record-carrier transmission coil combined with a record carrier which is in its operating position, which is attributable to the advantageous construction of the holding means, which do not require any more space than the space which is available anyway between the station transmission coil and the carrier transmission coil.

In a recording and/or reproducing apparatus in accordance with the invention the station transmission coil may, for example, consist of a coil wire wound to a flat shape, which is, for example, glued to a table-like holder or to a bounding surface of a turret-like holder. However, it has proved to be very advantageous when a recording and/or reproducing apparatus in accordance with the invention, in addition, has a station transmission coil formed by a printed circuit accommodated on a base plate. In this way, a constructionally very simple, reliable and non-aging solution is obtained.

In a recording and/or reproducing apparatus in accordance with the invention having a station transmission coil formed by a printed circuit it has proved to be very advantageous when, in addition, at its side which is remote from the station transmission coil the base plate is connected to a holding plate and the holding plate forms a part of the holding means. This results in a very stable construction. Moreover, this guarantees a particularly stable fastening of the station transmission coil.

In a recording and/or reproducing apparatus in accordance with the invention having a holding plate it has proved to be very advantageous when, in addition, inside the station transmission coil, in the form of a printed circuit, the base plate has a first passage of given cross-sectional dimensions, and the holding plate has a second passage which is substantially concentric with the first passage and whose cross-sectional dimensions are smaller than the cross-sectional dimensions of the first passage, as a result of which the holding plate has a free peripheral portion, which is not covered by the base plate, and the holding means include a holder case having a bottom wall and at least one side wall connected to the bottom wall, as well as a peripheral wall connected to the at least one side wall and projecting laterally outward from the at least one side wall, and from the side of the base plate the holder case is passed through the base plate and the holding plate at the location of the first passage and the second passage, and the peripheral wall of the holder case engages with the free peripheral. In this case, it has further proved to be advantageous when, in addition, the holding means include a holding block mounted on a chassis of the storage apparatus, which holding block, at its end which remote from the chassis, has a flat bounding surface and has a central passage, which starts at the flat bounding surface, and the holding plate lies on the flat bounding surface and the holder case is accommodated in the central passage. These measures have the great advantage that in the case of a fault and a defective station transmission coil the station transmission coil can be replaced in a simple manner.

In view of a simple mounting of the holding means it has proved to be very advantageous when a fixing screw is provided to secure the holding means to the chassis, which screw acts in the area of the bottom wall of the holder case with one end and in the area of the chassis with the other end in a recording and/or reproducing apparatus in accordance with the invention having a holder case. This guarantees a particularly reliable holding by the holding means in the recording and/or reproducing apparatus in accordance with the invention, while in addition a simple exchangeability of the complete holding means is achieved.

The above-mentioned as well as further aspects of the invention will become apparent from the embodiment described hereinafter by way of example and will be elucidated with reference to this example.

BRIEF DESCRIPTION OF THE DRAWINGS

The invention will now be described in more detail with reference to the drawings, which show an embodiment given by way of example but to which the invention is not limited.

DETAILED DESCRIPTION OF THE INVENTION

Figure 1:
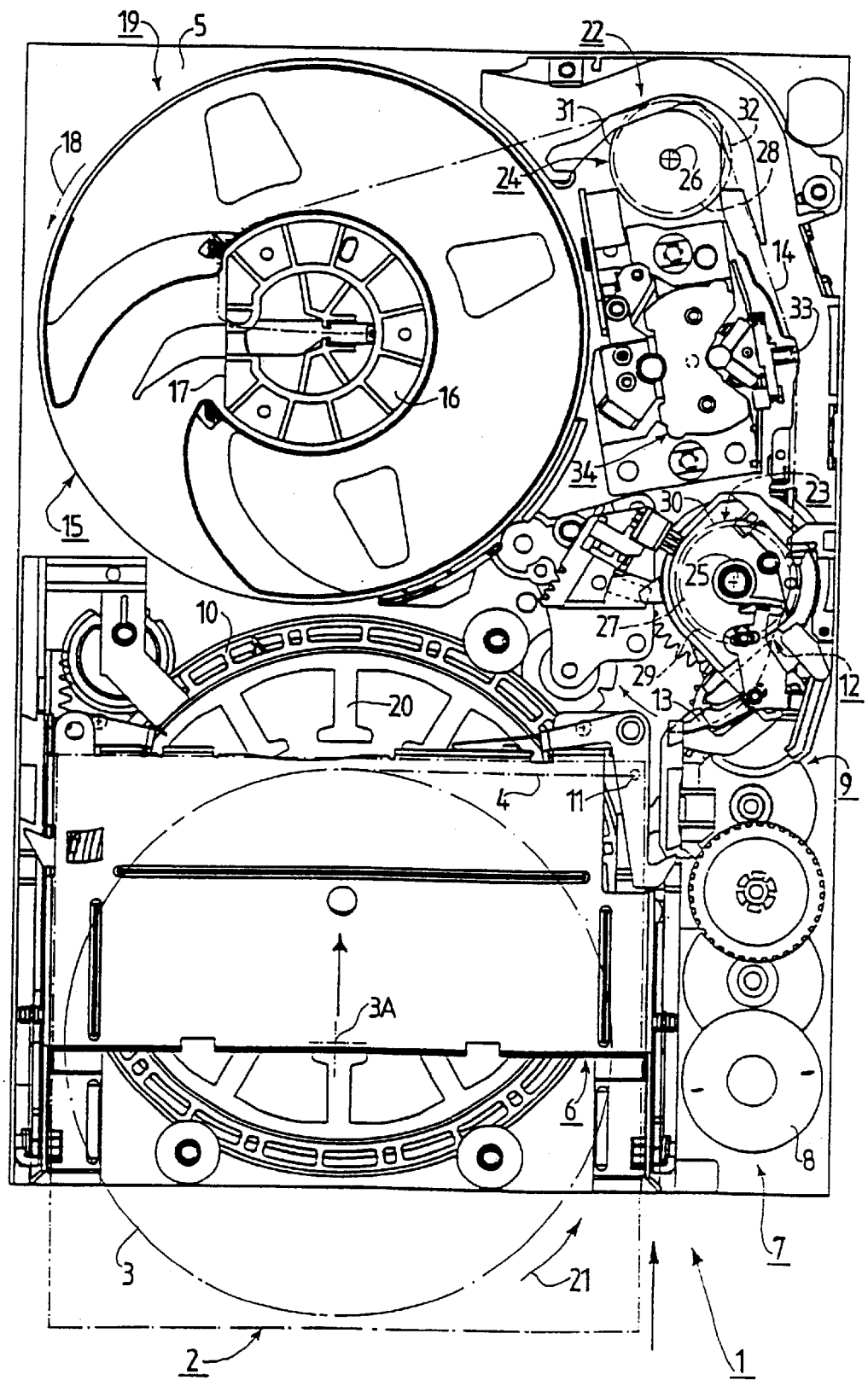
FIG. 1 is a plan view which shows a recording and/or reproducing apparatus in accordance with an embodiment of the invention, which apparatus includes a transponder communication station having a station transmission coil held with the aid of holding means.

FIG. 1 shows a recording and reproducing apparatus 1 which serves to and is configured for the recording and reproduction of digital data and by means of which a large amount of data can be stored. The recording and reproducing apparatus 1 is briefly referred to hereinafter as the storage apparatus 1.

The storage apparatus 1 is a development of a recording and reproducing apparatus which includes features forming the subject matter of nine patent applications in total, namely the European priority patent applications bearing the application numbers 98 890 332.4, 98 890 333.2, 98 890 334.0, 98 890 335.7, 98 890 336.5, 98 890 337.3, 98 890 338.1, 98 890 339.9 and 98 890 340.7 filed on Nov. 12, 1998. Said recording and reproducing apparatus was already shown at the Comdex fair of Las Vegas in the USA from Nov. 15, 1998 and is consequently known. The disclosure represented by the exhibited recording and reproducing apparatus and for a substantial part contained in the nine aforementioned European priority patent applications is incorporated herein by reference. For this reason, the remainder of the description of the storage apparatus shown in FIG. 1 is limited to only those areas and parts which are relevant in the present context. Furthermore, in the present context reference is also made to the two European priority patent applications bearing the application numbers 99 890 360.3 and 99 890 361.1, both filed on Nov. 11, 1999.

The storage apparatus is adapted to hold a cassette 2, which is shown only in dash-dot lines in FIG. 1. The cassette 2 accommodates a supply reel 3, which is rotationally drivable with respect to a reel axis 3A and which serves to and is adapted to take up (wind) a magnetic tape 4, which tape as well as the supply reel 3 are shown merely as dash-dot lines in FIG. 1. The magnetic tape 4 can be scanned along a plurality of tracks which extend in the longitudinal direction of the magnetic tape 4, in order to record or reproduce digital data.

The storage apparatus 1 has a chassis 5 which carries the individual constructional units and parts of the storage apparatus 1. Hereinafter, only those of the constructional units and parts are mentioned which are relevant in the present context.

For holding a cassette 2 and moving it from a loading position into an operating position in the storage apparatus 1 the storage apparatus 1 has a movable cassette holder 6. The movable cassette holder 6 is movable along an L-shaped path of movement between a loading position, in which a cassette 2 can be inserted into the cassette holder 6, and an operating position, in which an inserted cassette 2 is in its operating position.

To move the cassette holder 6 and further movable apparatus parts of the storage apparatus 1 the storage apparatus 1 has drive means 7. The drive means 7 include a motor 8 and a gear mechanism 9, by means of which a ring-shaped drive gear wheel 10 is drivable. With the aid of the ring-shaped drive gear wheel 10 cam devices, by means of which the movable cassette holder 6 is movable, can be driven via gear racks.

When the cassette holder 6 is in its operating position a cassette 2 loaded into the cassette holder 6 is also in its operating position. As already stated, the cassette 2 accommodates a supply reel 3 on which the magnetic tape 4 is wound. At the free end of the magnetic tape 4 the magnetic tape 4 is connected to a coupling pin 11. In the operating position of the cassette 2 pull-out means 12 can be coupled to the coupling pin 11, which means include a pull-out element 13 and a pull-out tape 14. For the clarity of the drawing the pull-out tape 14 is shown as a dash-dot line in FIG. 1. The pull-out tape 14 is passed from pull-out element 13 to a take-up reel 15 and is fixedly connected to a hub portion 16 of the take-up reel 15. The hub portion 16 has a recess 17 which is adapted to receive the pull-out element 13. By means of a first motor, not shown, of the storage apparatus 1 the take-up reel 15 is rotationally drivable in a direction indicated by an arrow 18. The rotational drive of the take-up reel 15 enables the pull-out tape 14 and, consequently, the pull-out element 13 to be driven, as a result of which, after coupling of the pull-out element 13 to the coupling pin 11, the magnetic tape 4 can be pulled out of the cassette 2 with the aid of the pull-out tape 14 and can be moved up to the take-up reel 15 and can be wound onto the take-up reel 15, upon which recording on or reproducing from the magnetic tape 4 is possible.

The storage apparatus 1 has drive means 19 for driving the magnetic tape 4. The drive means 19 include the first motor, not shown, which has been provided in the storage apparatus 1 in order to drive the take-up reel 15 and which drives the take-up reel 15 with the aid of a drive member, not shown, which also forms a part of the drive means 19. The drive means 19 further include a second motor, which is not shown completely. FIG. 1 only shows a stator section 20 of the second motor, which stator section carries excitation coils, not shown, by means of which a rotor, not shown, of this second motor can be driven. The second motor can drive crown-like gear teeth which mesh with mating gear teeth provided on the supply reel 3, the supply reel 3 thus being drivable in a direction indicated by an arrow 21 by means of the second motor to wind the magnetic tape 4 onto the supply reel 3. Thus, the supply reel 3 also forms a part of the drive means 19. The two kinds of gear teeth will be described in greater detail hereinafter.

The storage apparatus 1 further has guide means 22 for guiding the magnetic tape 3. In the present case the guide means 22 include two tape guide rollers 23 and 24. Each of the two tape guide rollers 23 and 24 has a guide shaft, 25 and 26 respectively, which shafts are stationarily connected to the chassis 5, and a guide surface, 27 and 28 respectively, which is cylindrical with respect to the respective guide shaft 25 or 26. Further, each of the two tape guide rollers 23 and 24 has an end flange, 29, 30 and 31, 32 respectively, in the area of each of the two axial ends of the respective cylindrical guide surfaces 27 and 28, which end flanges extend transversely to the respective guide shafts 25 and 26.

The storage apparatus 1 further has a multi-track magnetic head 33 which serves for scanning the magnetic tape 4. The magnetic head 33 is mounted on an actuator device 34 by means of which the magnetic head 33 is movable in a direction perpendicular to the longitudinal direction of the magnetic tape 4 to keep the individual magnet systems of the multi-track magnetic head 33 constantly aligned with respect to the scanning tracks of the magnetic tape 4, so as to guarantee an exact tracking. The magnetic head 33 is arranged in the area between the two tape guide rollers 23 and 24. With the aid of the actuating device 34 the magnetic head 33 can follow variations in the height position of the magnetic tape 3.

Figure 3:
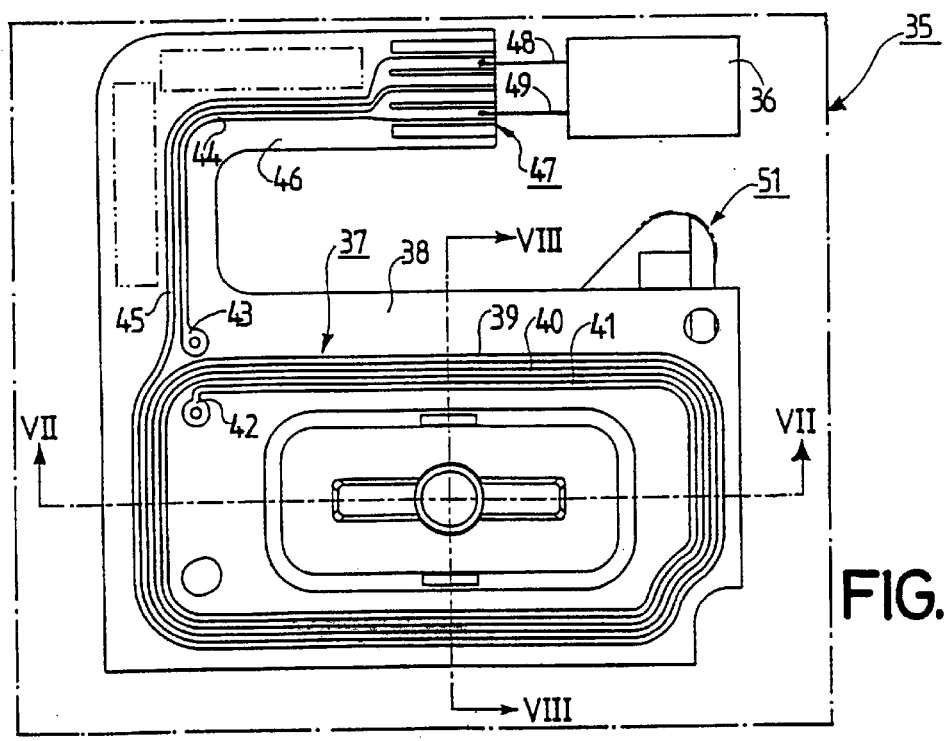
FIG. 3 shows the transponder communication station, the transmission coil and the holding means of the transmission coil being shown in a plan view.

The storage apparatus 1 includes a transponder communication station 35, which is partly shown diagrammatically in FIG. 3 but which is not shown in FIG. 1. The transponder communication station 35 has a write/read circuit 36 and a planiform station transmission coil 37. The station transmission coil 37 is formed by a printed circuit accommodated on a base plate 38. In the present case, the station transmission coil has a total of three coil turns 39, 40 and 41, the inner end 42 of the inner coil turn 41 being connected to one end 43 of a connection lead 44 via a conductive link, not shown. The outer coil turn 39 directly passes into a second connection lead 45. The two connection leads 44 and 45 are accommodated on an L-shaped extension 46 of the base plate 38. The connection leads 44 and 45 lead to a plug connector plug 47. The plug connector 47 connects to a socket connector, not shown, from which two connection leads 48 and 49 lead to the write/read circuit 36.

Figure 7:
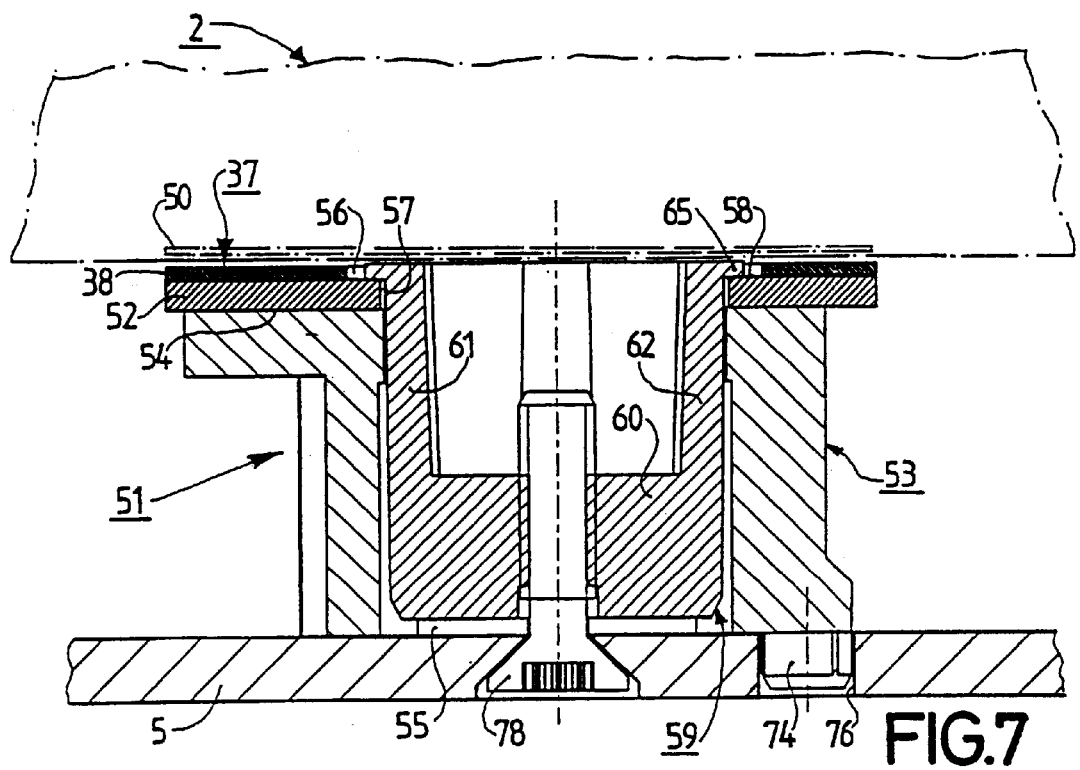
FIG. 7 shows the station transmission coil and the holding means for holding the station transmission coil in a sectional view taken on the line VII—VII in FIG. 3.
Figure 8:
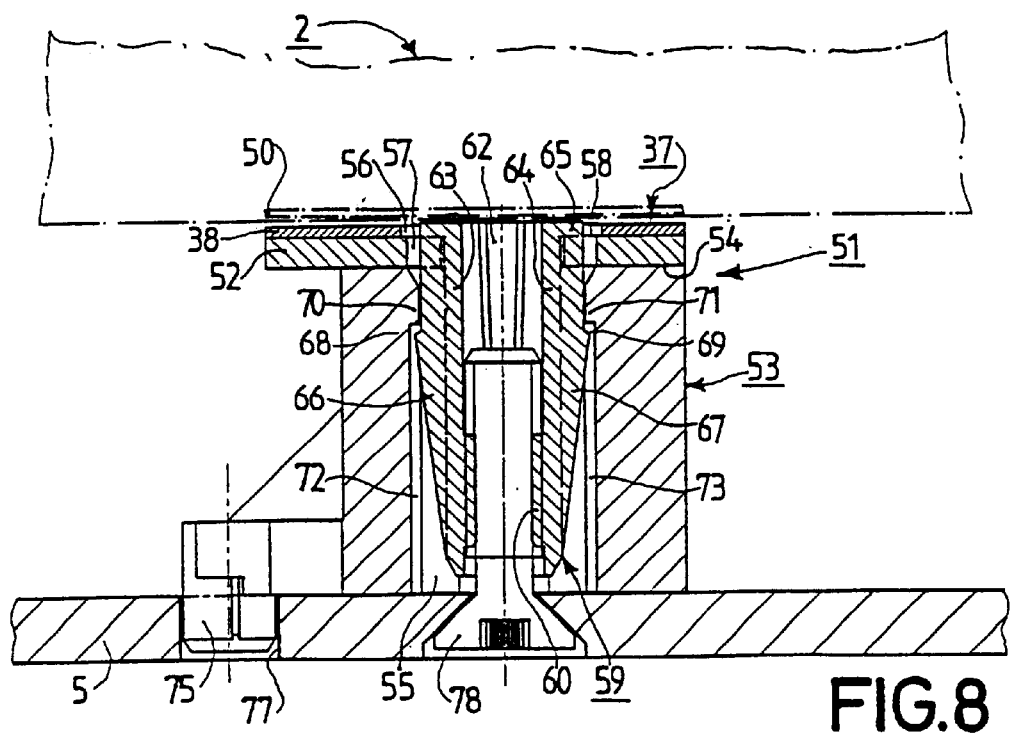
FIG. 8 shows the station transmission coil and the holding means for the station transmission coil in a sectional view taken on the line VIII—VIII in FIG. 3.

The station transmission coil 37 serves for the contactless communication with a record-carrier transmission coil 50 combined with the magnetic tape 4, which record-carrier transmission coil 50 is shown diagrammatically in dash-dot lines in FIGS. 7 and 8 but is not shown in FIG. 1. The record-carrier transmission coil 50 is integrated in the housing of the cassette 2 and is connected to an integrated circuit device, the integrated circuit device together with the record-carrier transmission coil 50 forming a transponder, which serves to store data specific to the cassette 2 or the magnetic tape 4.

In the present case, the station transmission coil 37 is planiform, as already stated and as is apparent in particular from FIG. 3 but also from FIGS. 7 and 8. The station transmission coil 37 has a first side, which faces the record-carrier transmission coil 50 and which is visible in FIG. 3, and a second side, which is remote from the record-carrier transmission coil 50 and which is not visible in FIG. 3.

The storage apparatus 1 has holding means 51 for holding the station transmission coil 37. The special and advantageous feature of said holding means 51 is that the holding means 51 extend mainly away from the second side of the station transmission coil 37, which means that in relation to the station transmission coil 37, as is apparent from FIGS. 7 and 8, the holding means 51 are disposed substantially only at the side remote from the cassette 2 and, consequently, require no additional space at all in the small space which is available anyway between the cassette 2 and the station transmission coil 37, as is apparent from FIGS. 7 and 8. Thus, it is achieved in this manner that the distance between the station transmission coil 37 and the record-carrier transmission coil 50 remains particularly small, which is very favorable in view of a proper and faultless inductive communication between the two transmission coils 37 and 50.

Figure 2:
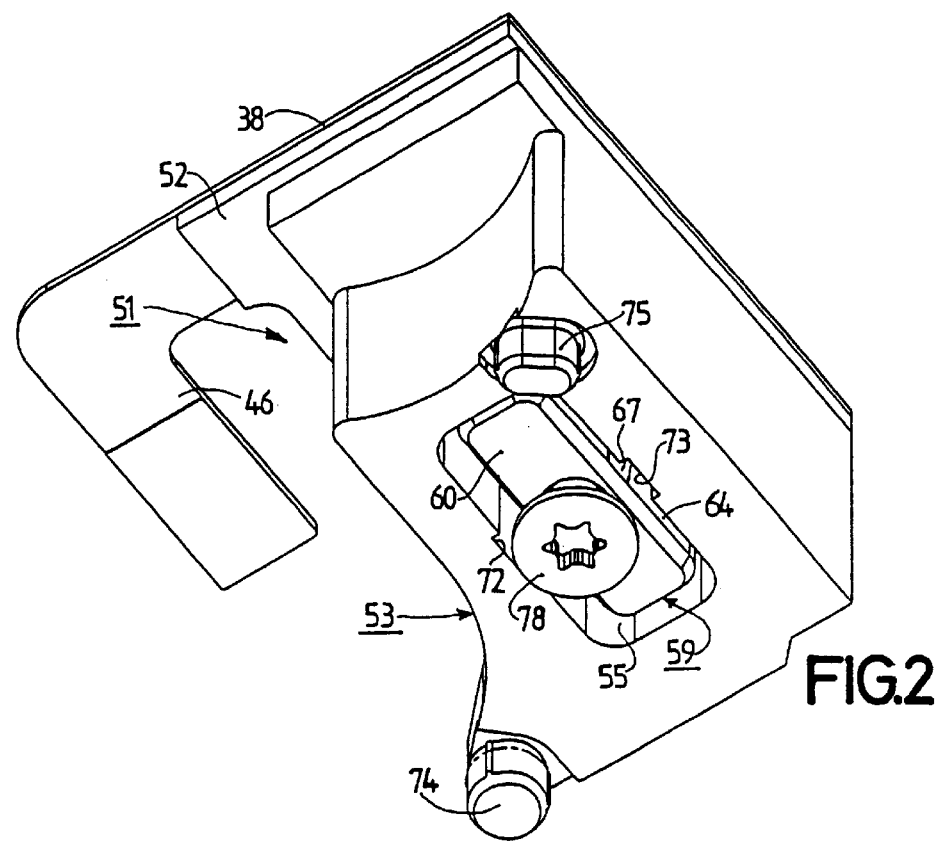
FIG. 2 shows the holding means for holding the station transmission coil in an oblique view from underneath.

As is apparent from FIGS. 2, 7 and 8, the base plate 38 has its side which is remote from the station transmission coil 37 connected to a holding plate 52, which holding plate 52 forms a part of the holding means 51. The connection between the base plate 38 and the holding plate 52 is made by means of an adhesive joint. The holding plate 52 is a glass-fiber reinforced plastic plate, which serves to reinforce the base plate 38.

Figure 4:
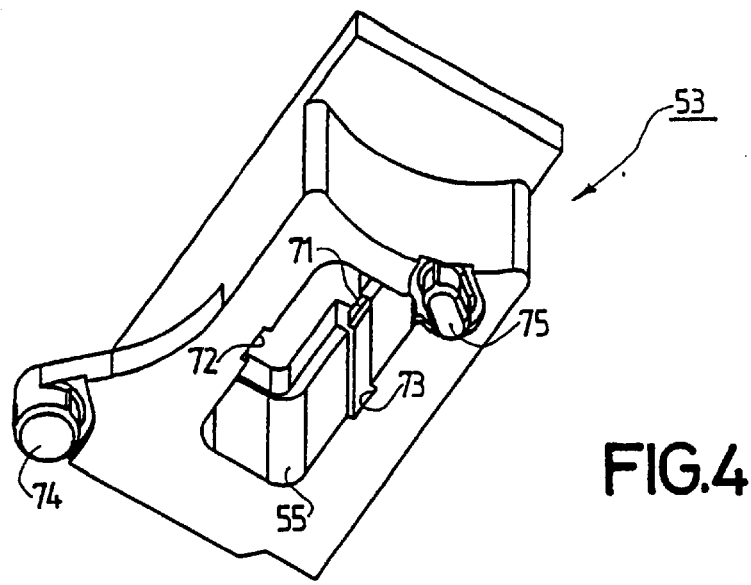
FIG. 4 is an oblique underneath view of a holding block of the holding means shown in FIG. 2.
Figure 5:
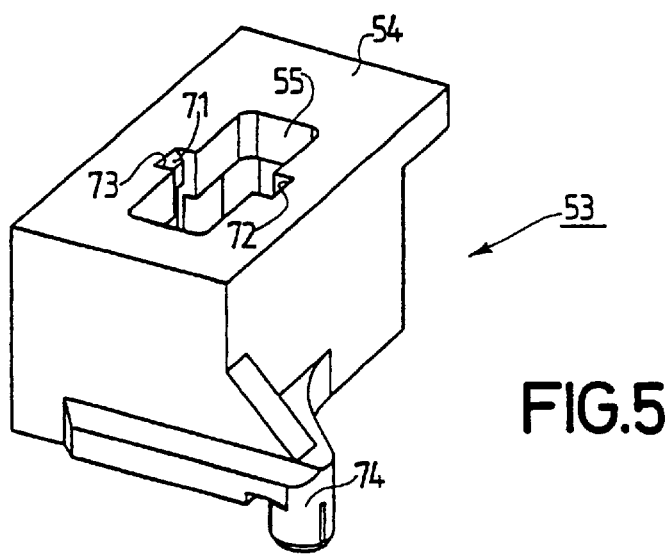
FIG. 5 is an oblique top view of the holding block shown in FIG. 4.

The holding means 51 further have a holding block 53 mounted on the chassis 5 of the storage apparatus 1, which block is shown separately in FIGS. 4 and 5. At its end which remote from the chassis 5 the holding block 53 has a flat bounding surface 54. The holding block 53 further has a central passage 55, which extends from the flat bounding surface 54 to the chassis 5. As is apparent from FIGS. 2, 7 and 8, the holding plate 52 lies on the flat bounding surface 54 of the holding block 51.

As is apparent in particular from FIGS. 7 and 8, the base plate 38 has a first passage 56 inside the station transmission coil 37 in the form of a printed circuit. The first passage 56 has certain cross-sectional dimensions and is essentially rectangular with rounded corner areas. The holding plate 52 has a second passage 57 which is substantially concentric with the first passage 56 in the base plate 38. The cross-sectional dimensions of the second passage 57 are smaller than the cross-sectional dimensions of the first passage 56, as a result of which the holding plate 52 has a free peripheral portion 58, which is not covered by the base plate 38.

Figure 6:
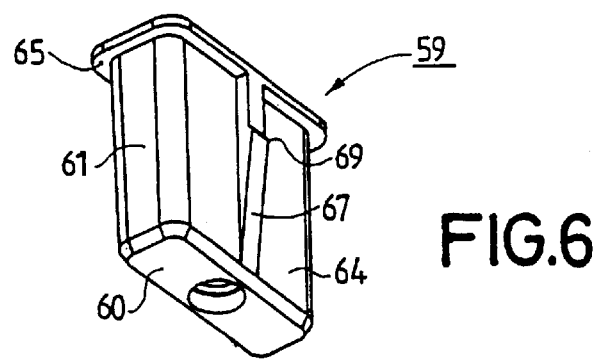
FIG. 6 is an oblique underneath view of a holder case of the holding means shown in FIG. 2.

The holding means 51 further have a holder case 59, which is shown separately in FIG. 6. The holder case 59 has a bottom wall 60 and four side walls 61, 62, 63 and 64 connected to the bottom wall 60, as well as a peripheral wall 65 connected to the four side walls 61, 62, 63 and 64 and projecting laterally outward from the four side walls 61, 62, 63 and 64. From the side of the base plate 38 the holder case 59 is passed through the base plate 38 and the holding plate 52 at the location of the first passage 56 and the second passage 57. The peripheral wall 65 of the holder case 59 thus engages with the free peripheral portion 58 of the holding plate 52. The outer surfaces of the two side walls 63 and 64 of the holder case 59 carry two ribs 66 and 67, which each have a latching projection 68 and 69, respectively. The two latching projections 68 and 69 engage behind latching shoulders 70 and 71 situated in channel-like recesses 72 and 73 formed in the area of the central passage 55 of the holding block 53.

To position and secure the holding block 53 and, consequently, the complete holding means 51 and the station transmission coil 37 the means described hereinafter are provided. The holding block 53 has two positioning portions 74 and 75 in the area of its end surface which is remote from the flat bounding surface, of which the first positioning portion 74 is of circular cross-section and the second positioning portion 75 is of oval cross-section. Each of the two positioning portions 74 and 75 engages in a positioning hole 76 and 77, respectively, in the chassis 5. To mount and secure the holding means 51 to the chassis 5 a fixing screw 78 is provided, which acts in the area of the bottom wall 60 of the holder case 59 with one end and in the area of the chassis 5 with the other end.

The invention is not limited to the recording and/or reproducing apparatus described hereinbefore with reference to FIGS. 1 to 8. For example, the holding means may alternatively be secured to a mounting plate which extends perpendicularly from a plate-shaped chassis in order to hold a station transmission coil adjacent to a side wall of a cassette. Furthermore, a construction may be chosen which uses a substantially thicker base plate for a station transmission coil formed by a printed circuit than in the case of the recording and/or reproducing apparatus described hereinbefore, thus enabling an additional holding plate to be dispensed with. The invention may also be applied to a recording and/or reproducing apparatus which is adapted to cooperate with an optically scanned disc-shaped record carrier, a record-carrier transmission coil and transponder IC which is electrically connected to this coil being arranged directly on the disc-shaped record carrier.

What is claimed is:

1. A recording and/or reproducing apparatus (1) adapted to receive a record carrier (4) and to hold the record carrier (4) in an operating position comprising:

a transponder communication station (35) having a station transmission coil (37) for the contactless communication with a record-carrier transmission coil (50) combined with the record carrier (4), wherein the station transmission coil (37) is planiform and has a first side facing the record-carrier transmission coil (50) and a second side remote from the record-carrier transmission coil (50); and holding means (51) have been provided to hold the station transmission coil (37), wherein the holding means (51) extends mainly away from the second side of the station transmission coil (37), wherein the station transmission coil (37) is formed by a printed circuit accommodated on a base plate (38), and wherein at its side which is remote from the station transmission coil (37) the base plate (38) is connected to a holding plate (52), and the holding plate (52) forms a part of the holding means (51), and further wherein inside the station transmission coil (37) in the form of a printed circuit the base plate (38) has a first passage (56) of given cross-sectional dimensions, and the holding plate (52) has a second passage (57) which is substantially concentric with the first passage (56) and whose cross-sectional dimensions are smaller than the cross-sectional dimensions of the first passage (56), as a result of which the holding plate (52) has a free peripheral portion (58), which is not covered by the base plate (38), and further wherein the holding means (51) includes a holder case (59) having a bottom wall (60) and at least one side wall (61, 62, 63, 64) connected to the bottom wall (60), as well as a peripheral wall (65) connected to the at least one side wall (61, 62, 63, 64) and projecting laterally outward from the at least one side wall (61, 62, 63, 64), and further wherein from the side of the base plate (38) the holder case (59) is passed through the base plate (38) and the holding plate (52) at the location of the first passage (56) and the second passage (57), and further wherein the peripheral wall (65) of the holder case (59) engages with the free peripheral portion (58) of the holding plate (52).

2. A recording and/or reproducing apparatus (1) as claimed in claim 1, characterized in that the holding means (51) include a holding block (53) mounted on a chassis (5) of the storage apparatus (1), which holding block, at its end which remote from the chassis (5), has a flat bounding surface (54) and has a central passage (55), which starts at the flat bounding surface (54), and the holding plate (52) lies on the flat bounding surface (54) and the holder case (59) is accommodated in the central passage (55).

3. A recording and/or reproducing apparatus (1) as claimed in claim 2, characterized in that a fixing screw (78) has been provided to secure the holding means (51) to the chassis (5), which screw acts in the area of the bottom wall (60) of the holder case (59) with one end and in the area of the chassis (5) with the other end.

* * * * *